(12) United States Patent
Miesak

(10) Patent No.: US 9,423,674 B1
(45) Date of Patent: Aug. 23, 2016

(54) SYSTEM AND METHOD FOR PROVIDING IMAGE ENCODING PROJECTION USING AN APODIZED LIQUID CRYSTAL DISPLAY PIXEL

(71) Applicant: LOCKHEED MARTIN CORPORATION, Bethesda, MD (US)

(72) Inventor: Edward J. Miesak, Windermere, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 47 days.

(21) Appl. No.: 14/207,835

(22) Filed: Mar. 13, 2014

Related U.S. Application Data

(60) Provisional application No. 61/806,736, filed on Mar. 29, 2013, provisional application No. 61/778,997, filed on Mar. 13, 2013.

(51) Int. Cl.
*G02F 1/1335* (2006.01)
*G03B 21/14* (2006.01)

(52) U.S. Cl.
CPC ........................................ *G03B 21/14* (2013.01)

(58) Field of Classification Search
CPC ....... G03B 21/26; G03B 15/10; G03B 21/006
USPC ................................................... 349/5, 15, 7
See application file for complete search history.

(56) References Cited

U.S. PATENT DOCUMENTS

| | | | |
|---|---|---|---|
| 4,859,994 A | 8/1989 | Zola et al. | |
| 5,793,470 A * | 8/1998 | Haseltine et al. | 353/20 |
| 5,868,480 A | 2/1999 | Zeinali | |
| 6,073,851 A | 6/2000 | Olmstead et al. | |
| 6,535,335 B2 | 3/2003 | Patel et al. | |
| 7,213,930 B2 | 5/2007 | Quach | |

(Continued)

FOREIGN PATENT DOCUMENTS

| JP | 2007084253 | 3/1995 |
|---|---|---|
| JP | 3045958 | 5/2000 |

(Continued)

OTHER PUBLICATIONS

International Search Report (ISA/KR), Jul. 17, 2014.

(Continued)

*Primary Examiner* — Nathanael R Briggs
(74) *Attorney, Agent, or Firm* — Terry M. Sanks, Esq.; Beusse Wolter Sanks & Maire, PLLC

(57) ABSTRACT

A system for projecting to a viewing surface includes an illumination source to project a first image onto the viewing surface along a beam path, an LCD, with at least one pixel having a polarization rotation profile that approaches zero at an edge, for placement in the beam path of the illumination source to the viewing surface to transmit the first image in a first polarization state through the LCD to the viewing surface and to propagate a second image in a second polarization state from the LCD to the viewing surface, and a first polarization filter to provide the first image in the first polarization state prior to the first image being transmitted through the LCD. At least one of the first image in the first polarization state and the second image in the second polarization state is in a non-detectable polarization state when illuminated upon the viewing surface.

25 Claims, 8 Drawing Sheets

(56) References Cited

U.S. PATENT DOCUMENTS

| | | | |
|---|---|---|---|
| 7,414,698 B2 | 8/2008 | Cashin et al. | |
| 7,690,794 B2 | 4/2010 | Boothroyd | |
| 8,506,085 B2 | 8/2013 | Azor et al. | |
| 2007/0046898 A1 | 3/2007 | Conner | |
| 2007/0139792 A1 | 6/2007 | Sayag | |
| 2010/0039689 A1 | 2/2010 | Sayag | |
| 2010/0085750 A1 | 4/2010 | Van Ostrand et al. | |
| 2010/0289969 A1 | 11/2010 | Yamazaki et al. | |
| 2011/0280043 A1* | 11/2011 | Van Ostrand et al. | 362/606 |
| 2013/0155352 A1 | 6/2013 | Wicker | |
| 2013/0229586 A1* | 9/2013 | Yanai | H04N 13/0434 349/8 |

FOREIGN PATENT DOCUMENTS

| | | |
|---|---|---|
| JP | 2000250129 | 9/2000 |
| JP | 2008165077 | 7/2008 |
| JP | 20110181216 | 4/2011 |
| KP | 20040058969 | 7/2004 |
| KR | 20000042136 | 7/2000 |
| WO | 2012064520 | 5/2012 |
| WO | 2013040656 | 3/2013 |
| WO | 2013059228 | 4/2013 |

OTHER PUBLICATIONS http://www.syracuse.com/entertainment/index.ssf/2013/06/closed_caption_glasses_movies_regal_theaters_deaf.html, Jun. 2013.

* cited by examiner

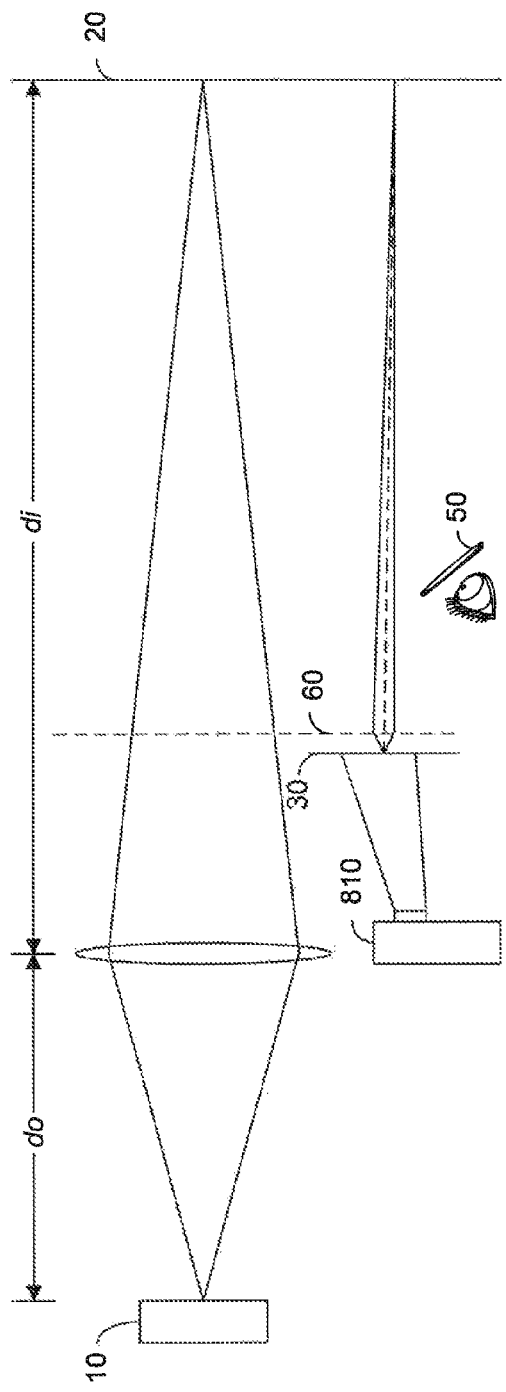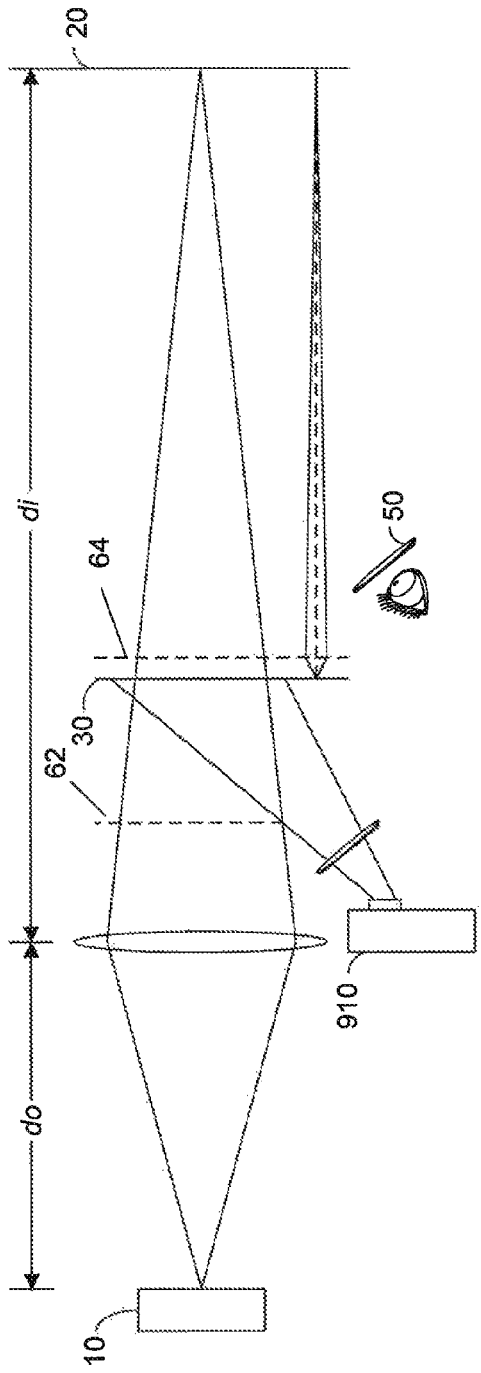

SYSTEM AND METHOD FOR PROVIDING IMAGE ENCODING PROJECTION USING AN APODIZED LIQUID CRYSTAL DISPLAY PIXEL

CROSS-REFERENCE TO RELATED APPLICATIONS

This application claims the benefit of U.S. Provisional Application No. 61/806,736 filed Mar. 29, 2013, and U.S. Provisional Application No. 61/778,997 filed Mar. 13, 2013, and both incorporated herein by reference in their respective entirety.

BACKGROUND

Embodiments relate to an imaging system and, more particularly, to a system and method to obtain a high spatial resolution of information that would not be normally available when viewing a projected image, but is viewable when appropriate eyewear is used.

Steganography is an art and science of writing hidden messages in such a way that no one, apart from a sender and an intended recipient, suspects the existence of the message. Other than applying steganography techniques to assist in detecting counterfeited legal tender, such techniques are generally not used in association with typical activities involving consumers. For example, an approach using steganography to view closed caption information on a screen at a movie theater would be beneficial. Currently, there is no means to incorporate closed captioned information directly on a movie screen without all individuals viewing the movie seeing the closed captioned information. For example, glasses have been developed which use a receiver and transmitter to receive closed captioned information and then display it within the glasses for a wearer so that only the wearer sees the closed captioned information. These glasses with transmitters and receivers can be expensive to replace, repair and/or maintain. Other proposed approaches include using iPads®, tablets or cell phones to receive closed captioned information from the movie theater through Bluetooth® technology or a similar communication protocol, where the user could then watch the closed captioning on the device while watching the movie. Another tried option involved displaying the closed captioning on a back wall of the theater and watching the movie through a "window" at the user's seat. The window would reflect the closed captioning to the user. However, these approaches have tended not to be acceptable by the viewing public or by theater owners.

Because of the cost associated with having such glasses requiring transmitters and receivers, another approach is to encode the closed caption directly onto the movie, but making the closed caption only available to certain users, such as those wearing a particular type of glasses. One approach involved a use of an ordinary liquid crystal display ("LCD") between the projector and viewing screen. However, the resultant images were found to be blurry due primarily to diffraction, which is a result of shapes of pixels of the LCD, which are a smallest addressable element of the LCD, having sharp edges. The pixels are usually provided in a two-dimensional grid, and are often represented using dots or squares. Though pre-compensation may be used to sharpen an image viewed on a movie screen, an amount the images may be sharpened is limited by a dynamic range of the encoding system, which relates back to the pixels.

If a viewer of images on the movie screen desired to view information that would not be normally available for viewing, such as, but not limited to, closed captioned information or subtitles, such viewers would not be able to see the closed caption or subtitles unless the entity operating the projection system activated that feature. However, in activating the closed caption or subtitles feature, all viewers of the images would see the closed caption or subtitles as well. Thus, manufacturers, users and consumers would benefit from being able to be provided information where the information is not readily visible to others, but through a form of steganography such information may be viewable by specific viewers where the information has clear resolution.

SUMMARY

Embodiments relate to a system, kit, and method to view high spatial resolution of information that would not be normally viewable when viewing an imaging device, but is viewable when appropriate eyewear is used. The system may be used for projecting to a viewing surface. The system comprises an illumination source configured to project a first image onto the viewing surface along a beam path. The system also comprises a transmissive liquid crystal display (LCD), configured with at least one pixel having a polarization rotation profile that approaches zero at an edge of the at least one pixel, for placement in the beam path of the illumination source to the viewing surface to transmit the first image in a first polarization state through the LCD to the viewing surface and to propagate a second image in a second polarization state from the LCD to the viewing surface. The system also comprises a first polarization filter configured to provide the first image in the first polarization state prior to the first image being transmitted through the LCD. At least one of the first image in the first polarization state and the second image in the second polarization state is in a non-detectable polarization state when illuminated upon the viewing surface.

The kit is for use with an imaging device that produces a first image in a first polarization state onto a viewing surface. The kit comprises a transmissive liquid crystal display (LCD), configured with at least one pixel having a polarization rotation profile that approaches zero at an edge of the at least one pixel, for placement in the beam path of the imaging device to the viewing surface to transmit the first image in a first polarization state through the LCD to the viewing surface and to propagate a second image in a second polarization state from the LCD to the viewing surface. An illumination light originating from the imaging device provides illuminated light for both the first image and the second image. At least one of the first image in the first polarization state and the second image in the second polarization state is non-detectable when illuminated upon the viewing surface.

The method comprises propagating a second image in a second polarization state to sync with a first image in a first polarization state with a transmissive liquid crystal display (LCD) as the first image is transmitted from an imaging device through the LCD and onto a viewing surface, the LCD is configured with at least one pixel having a polarization rotation profile that approaches zero at an edge of the at least one pixel and illuminating the first image and the second image with an illumination light from the imaging device onto the viewing surface with at least one of the first image in the first polarization state and the second image in the second polarization state being in a non-detectable polarization state when illuminated upon the viewing surface.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 8 shows another representation of an embodiment of the system;

FIG. 9 shows another representation of an embodiment of the system; and

DETAILED DESCRIPTION

Figure 1:
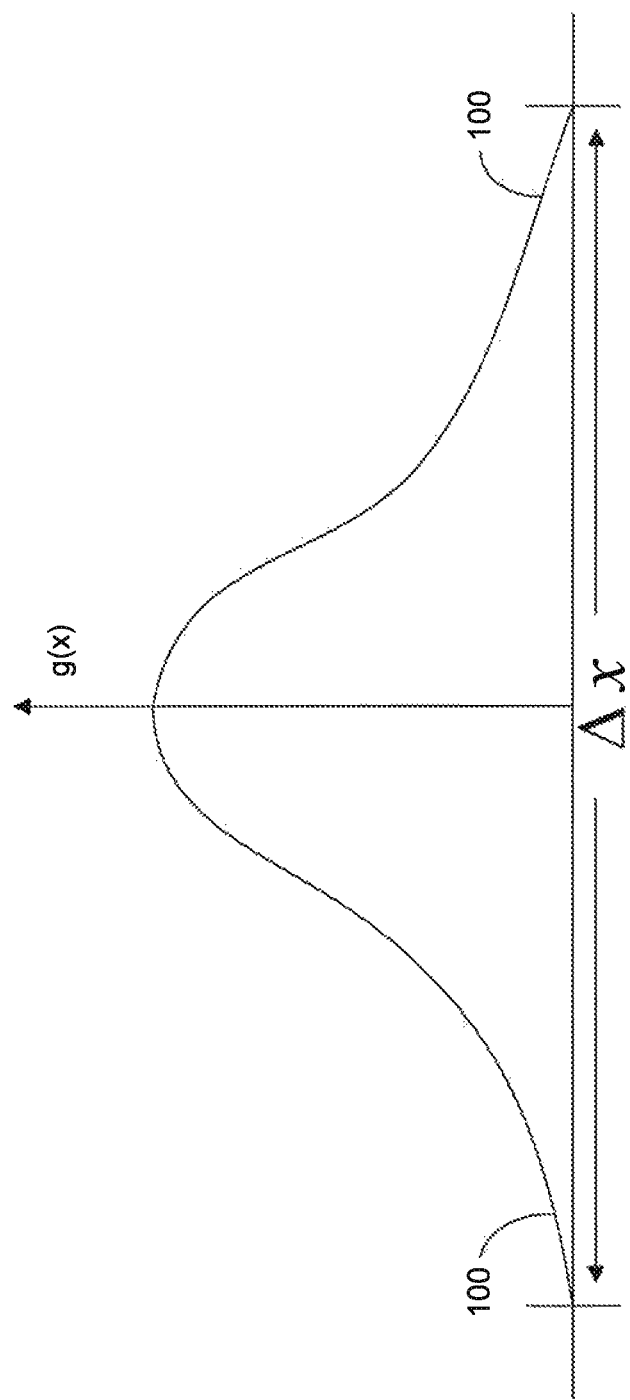
FIG. 1 shows a representation of a transition profile for an apodized pixel.

Embodiments are described herein with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, readily recognizes that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 2:
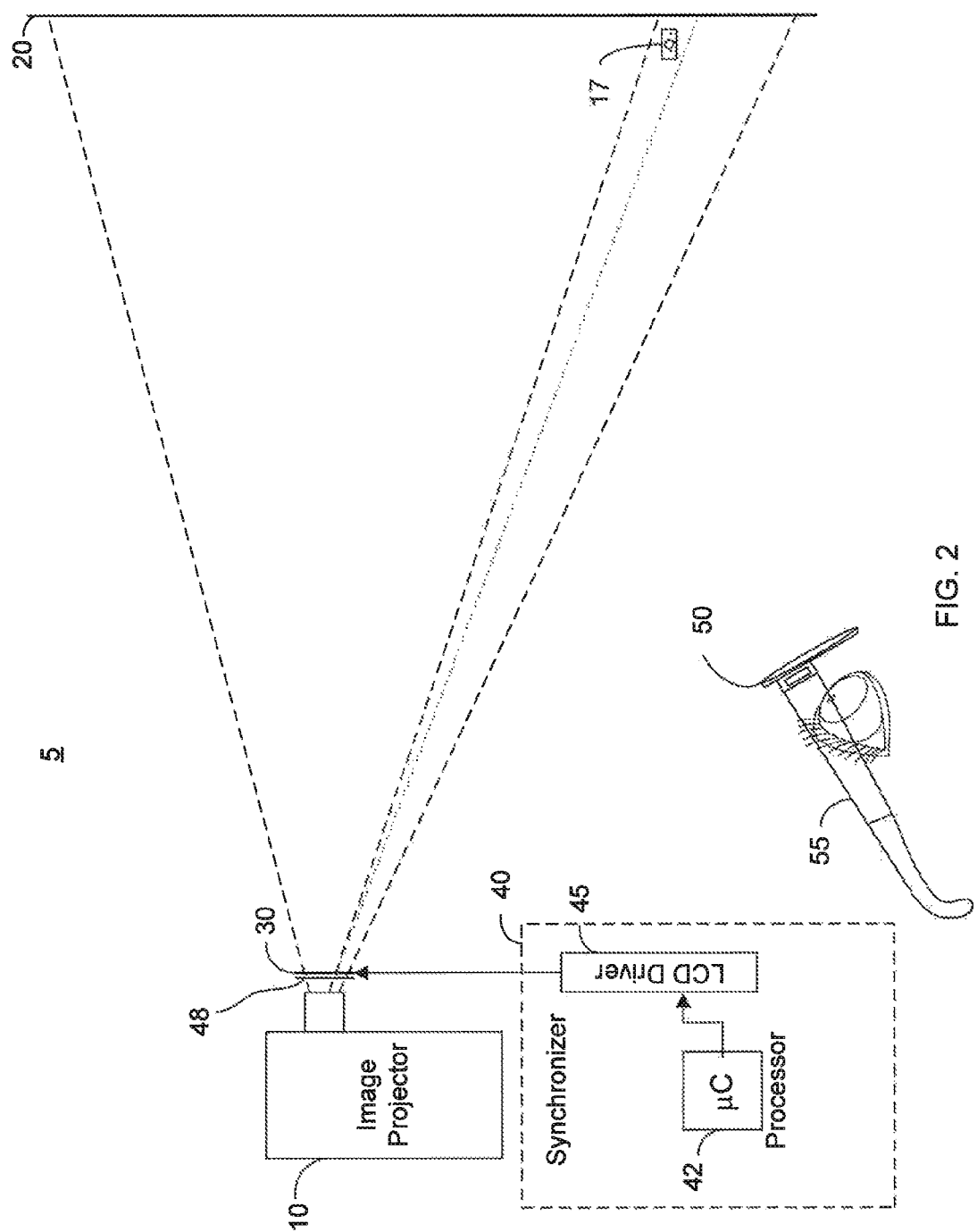
FIG. 2 shows a representation of an embodiment of a system.

FIG. 1 shows a representation of a transition profile for an apodized pixel. Though this representation is illustrated as being along a single axis, those skilled in the art will recognize that in reality each pixel has this profile along two orthogonal axes regardless of whether the pixel is square/rectangular or is rotationally symmetric, such as, but not limited to, being circular or elliptical. As illustrated, the pixel provides for a polarization rotation profile that approaches zero at its edges 100, at least one edge or an edge of the pixel. The transition through the polarization rotation profile also illustrates a gradual transition when approaching the edges 100. In an embodiment, a liquid crystal display ("LCD") 30 (as illustrated in FIG. 2), also referred to as an encoder, comprises at least one apodized pixel 220. In a non-limiting example, all of the pixels 220 of the LCD 30 are apodized pixels or the LCD 30 is a single apodized pixel. In an embodiment, the LCD 30 is a transparent LCD, thus making it transmissive. In an embodiment, the LCD 30 is clear. By using apodized pixels, blurriness of images illuminated, or transmitted, through or even provided on the LCD may be minimized.

FIG. 2 shows a representation of an embodiment of a system. Though not necessarily parts of the system 5, an image projector 10, imaging device or illumination source, and a screen or viewing surface 20 are disclosed. The term "image projector," "illumination source" or "imaging device" is used to include any system or device which projects or provides illumination for projecting an image, content, information, etc., along a beam path for viewing at another location, such as, but not limited to, a viewing surface 20. The image projector 10 may be a still-image projector, video projector, and/or an illumination component of a projection system. Thus, these terms are not provided to be limiting to a particular system or device. Furthermore, these terms may be used interchangeably.

The image, information or content provided from the illumination source 10 to the screen 20 may be considered a first image and may be in a first polarization state so that the content on the screen 20 may be visible or viewable without an eye being aided by some other device, such as, but not limited to, polarization glasses. As such, the terms "illumination" and "projection," including other verb tenses of these terms, may be used interchangeably as neither term is meant to be limiting with respect to the other.

The screen 20 may have a polarization preserving surface so that the polarization states of the first image illuminated from the illumination source 10 or the second image originated from LCD 30, but utilizing illumination from the illumination source 10, is not altered or changed while projected upon the screen 20.

The system 5 comprises an encoder or a liquid crystal display ("LCD") 30. The term "encoder" is used to define a device, subsystem, or element that provides for allowing an image in a second polarization state to be combined, or encoded with, the first image in the first polarization state at the encoder where further propagation of both images is accomplished with an illuminated light provided with the source of the first image, or the image projector 10. In an embodiment, the LCD may simply be considered an encoder 30. The LCD works by polarization rotation, but other polarization rotators exist that do not use liquid crystal display technology. The encoder 30 may be a polarization rotator an optical device that rotates the polarization axis of a polarized light source by an angle of choice. Polarization rotation may be, but is not limited to, being based on a principle of birefringence or multiple reflections. Polarization may be rotated using reflections or phase retardation due to a material birefringence. Reflections may be accomplished using mirrors, or surfaces resembling mirrors, and phase retardation due to birefringence can be accomplished with materials such as sucrose, sapphire, swamp water, and many more. However, these materials are not very practical to make an encoder. A polarization image encoder may be created using a material that can be optically manipulated rather than electrically manipulated such as a common LCD. For modulation, the LCD rotates the polarization of light passing through it on a pixel by pixel basis. The LCD encodes, propagates, places, injects, etc., the closed caption image, provided from the LCD via a synchronizer discussed in further detail below, onto the first image that is projected through it. Therefore the terms encoder and LCD are not to be limiting and may be used interchangeably herein as both are used to describe a device which provides for polarization rotation.

The terms "first polarization state" and "second polarization state" are not meant to be limiting. Thus, though the discussion herein suggests that the image in the polarization state is viewable by a human without an unaided eye and the second polarization state is only viewable by a human with a device to aid the eye, these positions may be switched. Thus, the first polarization state may be the state where aid is needed for the human eye to view an image and the second polarization state may be the state where no aid for the human eye is needed. Likewise, the use of the terms "first image" and "second image" are not meant to be limiting as the primary image may actually be the second image and the information provided to be "hidden" or in a non-viewable polarization state without an aid, may be the first image.

The LCD 30 with at least one apodized pixel 220 may rotate the image polarization from the illumination source 10 up to an orthogonal state, ninety degrees if linear or opposite handedness, right to left, or left to right, if circular or elliptical. The LCD 30 propagates or provides additional information, content, or a second image, in a second polarization state onto the first image which is illuminated from the illumination source 10 and viewed on the screen 20. The LCD 30 may be located in a line of sight, or beam path, from the illumination source 10 to the screen 20. Thus, the content emitted from the LCD 30 may not be visible or viewable on the screen 20 without the eye of the user being aided by some other device.

A first polarized filter 48 may be provided to ensure that the content illuminated from the illumination source 10 has a same polarization of a first polarization state. The polarized filter 48 may be provided along the beam path between the image projector 10 and the LCD 30. In another embodiment, the first polarized filter 48 may be a part of the LCD 30 on a side facing the image projector 10. As other non-limiting examples, the first polarized filter 48 may be a part of a focusing system 60 (later disclosed herein) which is located with the LCD 30 after the illumination source 10, a part of the illumination source 10, etc. As a non-limiting example, the illumination source 10 may have the polarized 48 filter as a part of the illumination source 10. Thus, the first polarized filter 48 may not be necessary as sufficient polarization may be available with the illumination source 10. As another non-limiting example, the first polarized filter 48 may improve a quality of the polarization experienced by the projected image prior to reaching the screen 20 and thus may still be included as an independent component or as part of the encoder 30. When included, the first polarized filter 48 may reduce a brightness of the image 225 generated by the illumination source 10, but only by a negligible amount.

A synchronizer 40 may be provided to synchronize the content from the LCD 30 with the content from the illumination source 10. The synchronizer may also comprise a processor 42 configured to synchronize data to be illuminated in the second polarization state with the image being illuminated in the first polarization state. An LCD driver 45 may be provided to control the LCD by providing the electronics to display the data in the second polarization state onto the transmissive material of the LCD 30. Thus, the second image may be produced so that it synchs, coincides, or aligns, with the first image being viewed.

Non-limiting examples of the second image may comprise, but is not limited to, subtitles, closed caption, any image or information which may be words, symbols, or alpha numeric characters, images, video, data, etc. Thus, if the first image contains characters speaking in a movie, the second image may contain text of what is being said where the synchronizer 40 ensures that the text is presented on the screen 20 at the same time the words are spoken by the characters. A location of the second image in correspondence with the first image is not limited as it may be located anywhere within or adjacent to the first image. As a non-limiting example, the second image may be provided as pop-up balloons, much like how text is illustrated in a comic book. When one of the images is in in a polarization state that is not viewable by an unaided human eye, it may be consider hidden.

A second polarized filter 50 may be provided so that when the screen 20 is viewed through it, both the first image and the second image are viewable. The second polarized filter 50, which may be configured to have a different orientation or a same orientation or line of sight to the screen 20 when compared to the LCD 30, is also provided. In other words, the path from the second polarized filter 50 to the screen may be the same or different than the beam path of the image projector 10 to the screen 20. In an embodiment, the second polarized filter 50 may be located along a second line of sight to the screen 20. As a non-limiting example, the second polarized filter 50 may be located in front of an eye of a user, such as, but not limited to, as wearable eyewear 55 or a piece of eyewear. Non-limiting examples of eyewear 55 may include, but are not limited to, a pair of sun glasses, clear polarized glasses (eyewear), a head wearable display ("HWD") device which may be a part of a head mounted display ("HMD") system, etc. Thus, the eyewear 55 simply holds the second polarized filter and no other components are needed on the eyewear, or to assist the human eye, to view image in the polarization state which is not visible to the human without some form of an aid. If used in a movie theater, the cost of a patron leaving with any theater-provided eyewear 55 is negligible financially.

By locating the second polarized filter 50 along the second line of sight, such as, but not limited to, in front of an eye, or eyes of the user, the user may be able to view the hidden, or non-discernible, image 245 (see FIG. 2) whereas other viewers not using the second polarized filter 50 will not see the hidden image 245. The first line of sight and the second line of sight as discussed above may not be mutually exclusive of each other. More specifically, both lines of sight may intersect before the screen 20 is reached.

Though the described system in FIG. 2 provides the first image in the first polarization state and the second image in the second polarization state where the illumination light is generated from a single source, specifically the image projector 10, the pixels illuminated on the screen 20 may be blurred, as represented by element 17 which identifies a blurred pixel. Thus, a focusing system may be provided to focus the images to eliminate blurriness.

Figure 3:
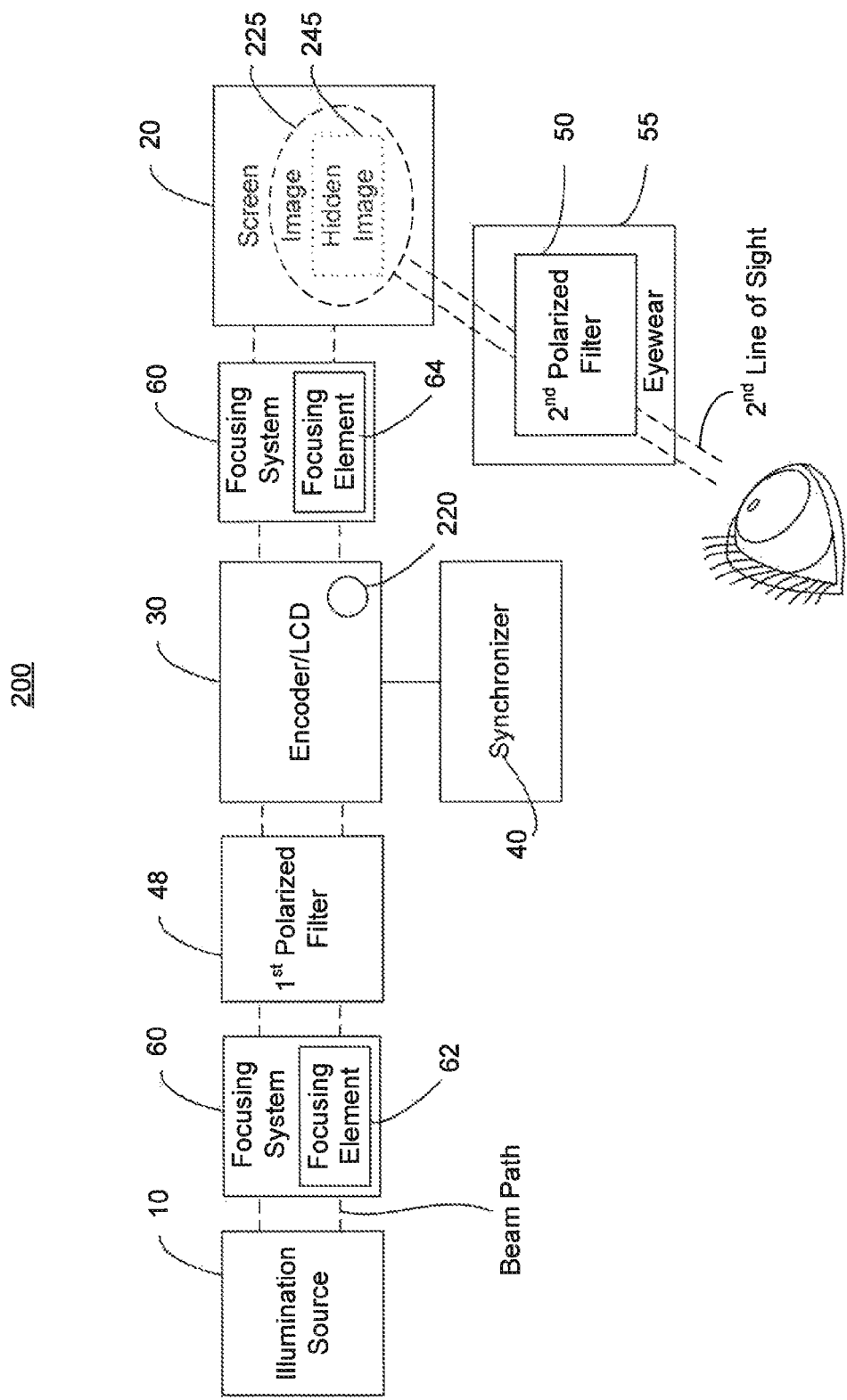
FIG. 3 shows a schematic illustrating an embodiment of a projection system using a polarization encoded projector.

FIG. 3 shows a block diagram illustrating an embodiment of the system. A beam path exists from the illumination source 10 to the viewable surface 20. The encoder 30 may be located within the beam path between the illumination source and the viewing surface 20. The first polarized filter 48 may be provided and may be located on the side of the LCD 30 closest to the image projector 10 or in between the LCD 30 and the image projector 10. The second polarized filter 50 may be provided and may be located along a second line of sight to the screen 20. The first image 225 is viewable by an unaided human eye. When both images are viewed through the second polarized filter 50 when on the screen 20, the second image 245 is made visible by the second polarized filter whereas the first image is still also visible through the second polarizer as it was visible even without the second polarized filter 50. The second polarizer filter 50 causes darkening or changing of colors of specific areas of the first image at the screen 20 to create the second image by contrast.

A focusing system 60 or subsystem may be provided to focus the pixel when viewed on the screen 20. A plurality of focusing systems may be utilized. In an embodiment, the focusing system 60 may be configured to focus a first image, provided in the first polarization state and projected from the image projector, at a first image plane along a beam path between the image projection system and the viewing surface. The first image plane is where the LCD 30 is positioned. The focusing system 60 may be further configured to focus the first image and the second image, created by the LCD 30, at a second image plane. The second image plane may be where the screen is located. Thus, as illustrated, the focusing system 60 may comprise a first focusing element to focus the first image at the first image plane, and a second focusing element to focus the first image and the second image at the second image plane.

More specifically, the illumination source 10 may project the first image 225, in a first polarization state which may be visible to the unaided human eye, onto the viewing area or screen 20. The image 225 may pass through the encoder 30, which may comprise the first polarized filter and the focusing system 60 prior to being viewed on the screen 20. The focusing system 60 and the encoder 30 are also located along the beam path of the illumination from the image projector 10 to the screen 20. A part of the focusing system 60 may also be provided to focus the first image and the second image when viewed on the screen 20. In an embodiment, the focusing system 60 comprises a first focusing element 62 which is configured to focus the first image at a first image plane, which is the location of the encoder 30, and a second focusing element 64 which is configured to focus the first and second image at a second image plane, which may be the location of the screen 20.

The second focusing element 64 may be provided to further focus the second image 245 on the screen 20. The second focusing element 64 may be designed to operate only at a specific polarization state of the hidden image 245 passing through the focusing element 64. Light of any other polarization state, such as that coming from the illumination source 10, may not be impacted by the polarization sensitive lens of this focusing element 64. The lenses of either focusing element 62, 64 may also be non-polarization sensitive whereas they may operate on any and all polarization states.

The first focusing element 62 and the second focusing element 64 may be flat transparent substrates with no optical power at a first polarization state. It may not alter any polarization state of the projection. The first polarized filter 48 and the encoder 30 may also be flat transparent substrates with no optical power. By being transparent, these elements are transmissive. This way the first polarized filter 48, encoder 30, first focusing element 62, and second focusing element 64 may be placed in the path of a video or still image projector or illumination source 10, which provides illumination, to the screen 20 and not impact the optical quality of the material or information being projected from the illumination source 10.

Figure 4:
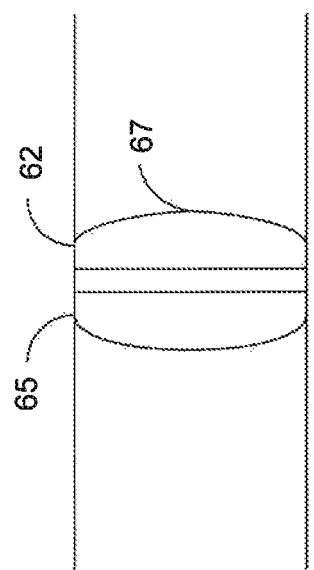
FIG. 4 shows an embodiment of a focus element.

FIG. 4 shows a schematic illustration of an embodiment of a focusing element of the focusing system. The focusing system may comprise a first lens element located in the beam path between the image projector 10 and the LCD 30 and a second lens element 64 located in the beam path between the LCD 30 and the screen 20. Either one or both of the lens elements may comprise achromatically corrected lenses of multiple elements. As illustrated, though not limiting as other configurations are possible, two achromatically corrected lenses 65, 67 are shown, with their "flatter" sides adjacent to each other. These lenses are typically curved on both surfaces, but one side will be curved more than the other. The illustration in FIG. 4 is provided simply to illustrate that the flatter sides are adjacent and is not provide to suggest a flat completely flat side for these lenses.

Figure 5:
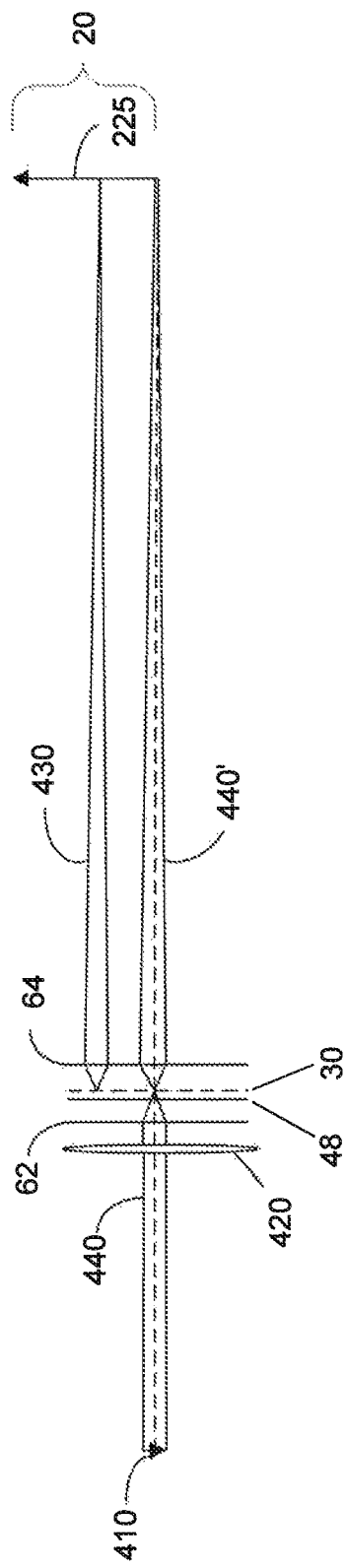
FIG. 5 shows another representation of an embodiment of the system with respect to focusing the images with a focusing system.

FIG. 5 shows a schematic illustrating an embodiment of the system using a polarization as described herein with respect to focusing the images. The system 5 comprises the illumination source 10 depicted as a projection system represented by a projector object 410 and the projection lens 420. The corresponding illuminated image 225, initiated from the illumination source 10, appears on the screen 20. If not a part of the LCD 30, the first polarized filter 48 may be located at a convenient location after the projection lens 420. As a non-limiting example, the first polarized filter 48 may even be designed to clip onto an outside region of a casing holding the projection lens 420. As another non-limiting example and as discussed previously, since many illumination sources comprise a lens with a polarized filter, the first polarized filter 48 may not be needed. The first polarized filter 48 may be clear, transparent, and featureless, much like a piece of clear window pane. Thus, the first polarized filter 48 may be configured not to degrade the first image 225 in the first polarization state that is eventually projected onto the screen 20. As discussed above, the encoder 30, or LCD, may inject, propagate or provide, additional information (as used herein the hidden image 245 or second image) into the light beam comprising the image 225 and then onto the screen 20.

Each focusing element 62, 64 of the focusing system 60 may reconstruct the image from the projector object 410 to the first focus plane which is where the LCD 30 is positioned and from the LCD 30 to the second focus plane, which is where the screen may be located based on the following thin lens equation in its Gaussian form:

$$\frac{1}{f} = \frac{1}{do} + \frac{1}{di}$$

where do is a distance between an object and a lens, di is a distance between the corresponding image and the lens, and f stands for a focal length of the lens. When using the respective focusing elements, having lenses to focus the additional content the size of the additional content provided by the encoder 30 may be based on the equation as follows:

$$M = \frac{-di}{do} = \frac{h'}{-h}$$

where M is for magnification, h' is the image height on the image 225 on the screen 20 and h is the image height within the LCD 30.

Though the focusing elements, in one embodiment are disclosed with two lenses, they may also consist of a compliment of any number of lenses (even a single lens) making up a complex lens system such as a telephoto lens. Using a telephoto lens allows more control over the magnification of the second or hidden image 245 on the screen 20. The lens system may allow the second image to be projected without being inverted either horizontally or vertically.

More specifically, a compliment of lenses and reflective elements working together can be designed to not invert the final image and to also control the magnification of the hidden image on the screen. A single lens may possibly invert the image both vertically and horizontally. In other embodiments, it may also be possible to use an array of single lenses or an array of telephoto lenses to image the encoder onto the screen. Each lens of the array would image one element of the encoder.

As discussed above, a viewer or user will not see the hidden image 245 since it has a polarization state that is not detectable to a human eye, unless the viewer is looking at the screen 20 through a second polarized filter 50 which is orientated to "de-code" the polarization encoded hidden image. Thus, the hidden image 245 may be brought into focus or provided visual clarity on the movie screen 20 by adjusting the focal length of the focusing element 60 or by adjusting its distance from the encoder 30. Determing clarity or focus may be assisted by viewing the hidden image 245 through a second polarized filter 50.

Thus, an illuminated image 440 (represented by a ray trace) passes through the focusing element 62 and is focused at the first focus plane which is where the LCD 30 is located. The illumination 440' then passes through the LCD 30 and then through the second focusing element 64, which focuses the illuminated image 440' at the second focus plane, which is where the screen 20 may be located. The second image 430 (represented by a ray trace) originates from the LCD 30 and is passed through the second focusing element 64, which focuses the illuminated second image 430 at the second focus plane, which is where the screen may be located.

Figure 6:
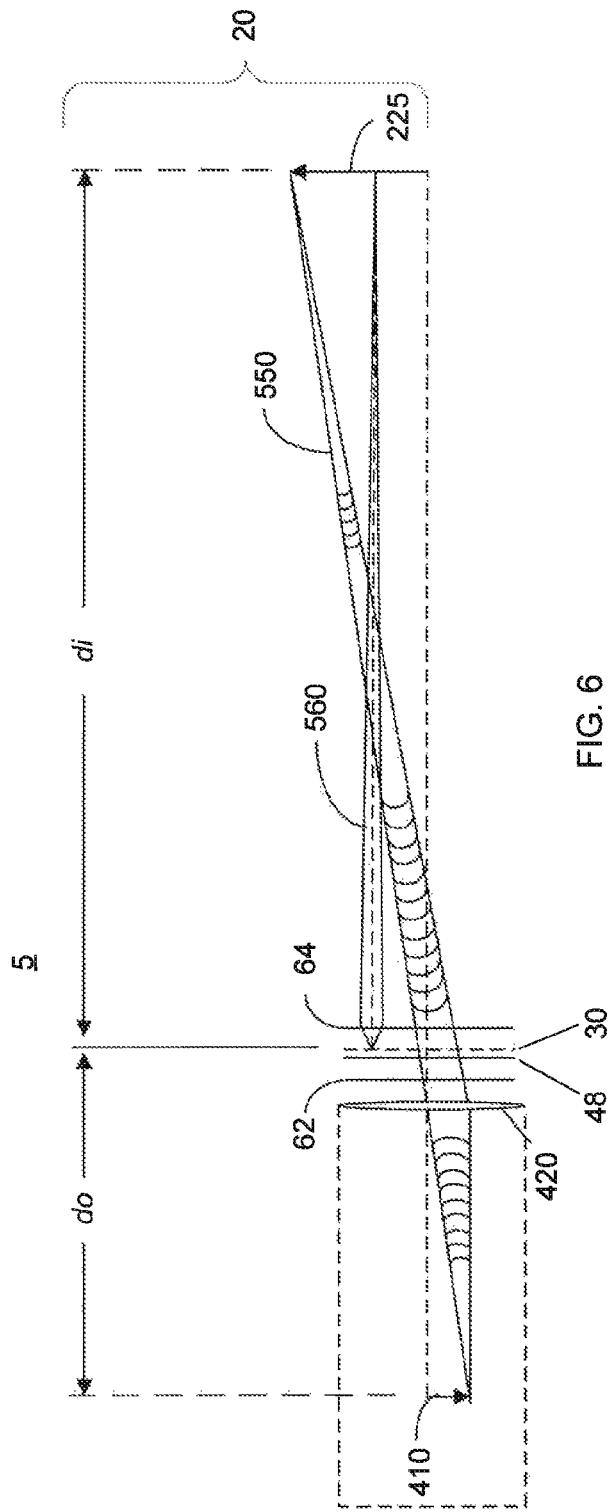
FIG. 6 shows another representation of an embodiment of the system with respect to focusing the images as disclosed in FIG. 5.

FIG. 6 shows another schematic illustrating an embodiment of the system using a polarization encoded projector system as described herein. Light passing from the illumination source 10 may have optical rays originating from a certain location of the illumination source 10 which are represented by a wavefront 550 shaped as illustrated. A wavefront is usually approximated using sections taken from circles where their origins are located at critical locations, in this case the screen 20. The wavefront 550 (within a ray trace) may not be distorted as it passes from the image projector 10 to the screen 20 where the rays of the wavefront 550 are not deviated by anything in their path from the projector lens to the screen 20. Thus, the wavefront shape generated by the illumination source 10 is not degraded, but it is focused by the focusing elements. More specifically, modifying the polarization state of this wavefront 550 such as, but not limited to, passing it through the focusing system 60 or LCD 30 as disclosed herein, even at multiple locations, does not necessarily change the shape of this wavefront 550.

A representation 560 (represented as a ray trace) of the second, or non-detectable, image 245 is also disclosed. As illustrated, it originates from the encoder 30, passes through the second focusing element 64, and then terminates on the screen 20. The second focusing element 64 is used to provide clarity of the first image 225 and the second image 245 when they are viewed through the second polarized filter 50.

Any obstructions, optical deviations, optical imperfections that are in the optical path from the illumination source 10 to the screen 20 that do inadvertently impact the light intensity wavefront 550 will impart diffraction onto the light, i.e., the imperfections may distort the shape of the wavefront 550. The closer the optical imperfection is to the projection lens 420, the worse the diffraction may be on the movie screen 20. Diffraction in this scenario manifests itself as an image blur. If the blur is bad enough, the feature causing it will not be visible on the movie screen 20. Therefore, when the LCD 30, and/or focusing system 60 is mounted close to the projection lens 420 of the illumination source 10, any imperfections in the LCD 30 and/or focusing system 60 will not be visible by the viewer. However, the encoder 30, and/or the focusing system 60 may be mounted far from the projection lens 420 as well.

Figure 7:
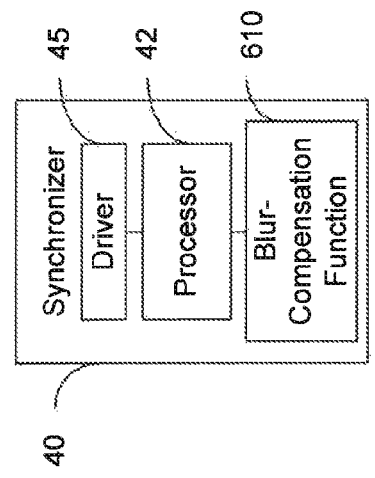
FIG. 7 shows another representation of an embodiment of the focusing system.

FIG. 7 shows another embodiment of the focusing system. As illustrated, instead of the focusing system 60 comprising focusing elements 62, 64 which comprise lenses, the focusing system 60 may comprise a non-transitory processor readable storage medium which provides for an executable computer program product that has an executable computer program product that may comprise a computer software code that, when executed, may control the processor 40 within the synchronizer to apply a blur compensation function to correct any blur.

In other words, a blur-compensation function 610 is provided within the synchronizer 40 and functions with the processor 42 to correct for blur associated with either the first image and/or the second image. The LCD driver 45 is also shown which is used to control placement of the second image onto the LCD 30.

As explained further herein, the encoder 30 may provide the second image as a hidden, or non-detectable, image 245 which is imparted on the image 225 that originates from the illumination source 10. The non-detectable image 245 is in a polarization state not discernible by the unaided human eye whereas the image 225 generated by the illumination source 10 is not altered or degraded at all when viewed by the unaided human eye. As disclosed in further detail in FIGS. 9 and 10, a second illumination source 810, 910 may feed or provide the non-viewable image 245 to the encoder 30 or directly to the screen 20. However, such systems require an additional component, namely, the second illumination source.

FIG. 8 shows another representation of the system. In this embodiment of the system 5, the encoder 30 is not in the first line of sight, or beam path, of the illumination source 10 to the screen 20. Instead it is in a third line of sight from the encoder 30 to the screen 20. A second illumination source 810 is provided to illuminate the hidden or second image 245. A focusing system 60 may be provided after the encoder 30. The polarized filter 50 may be in the second line of sight to the screen 20. Though not illustrated, the encoder 30 may be connected to the illumination source 10 through the synchronizer to ensure that the non-visible content contained in the hidden image 245 is synched with the visible content contained in the image 225 originated from the illumination source as both are displayed on the screen 20.

FIG. 9 shows another representation of an embodiment of the system. A projector 910, such as, but not limited to, a digital micro-mirror device to provide for digital light processing, may be used to illuminate an image onto the encoder 30. In a non-limiting example, the projector 910 may illuminate in an ultraviolet spectrum onto the encoder 30. As non-limiting examples, the projector 810 may be a pico-projector, mobile projector, mini beamer, etc. A projector lens 920 may be provided to image ultraviolet ("UV") light onto the encoder 30. The light that illuminates the LCD 30 causes the liquid crystal material to rotate the polarization of the light passing through it, namely the light from the image projector 10. An ordinary LCD does this electrically. The LCD 30 disclosed herein is being modulated not by electricity but by the UV light hitting it. Thus, such an LCD 30 is effectively one big LCD pixel. The visible light passing through the LCD 30 then has its polarization rotated by the liquid crystal material. The UV image is then projected through the LCD 30, the focusing system 60 to provide the second focal plane at the screen 20. The focusing system 60 may work in only a single polarization state or all polarization states. In another embodiment, the focusing system comprises the first focusing element 62 and the second focusing element 64. The second focusing element 64 is provided after the encoder 30 to provide the second focusing plane at the screen 20 and is in the beam path for both projectors 10, 810. The first focusing element 62 may be provided between a lens of the first projector 10 to provide for the first focusing plane at the location where the encoder 30 is located. The polarized filter 50 is provided along the second line of sight to the screen 20.

Figure 10:
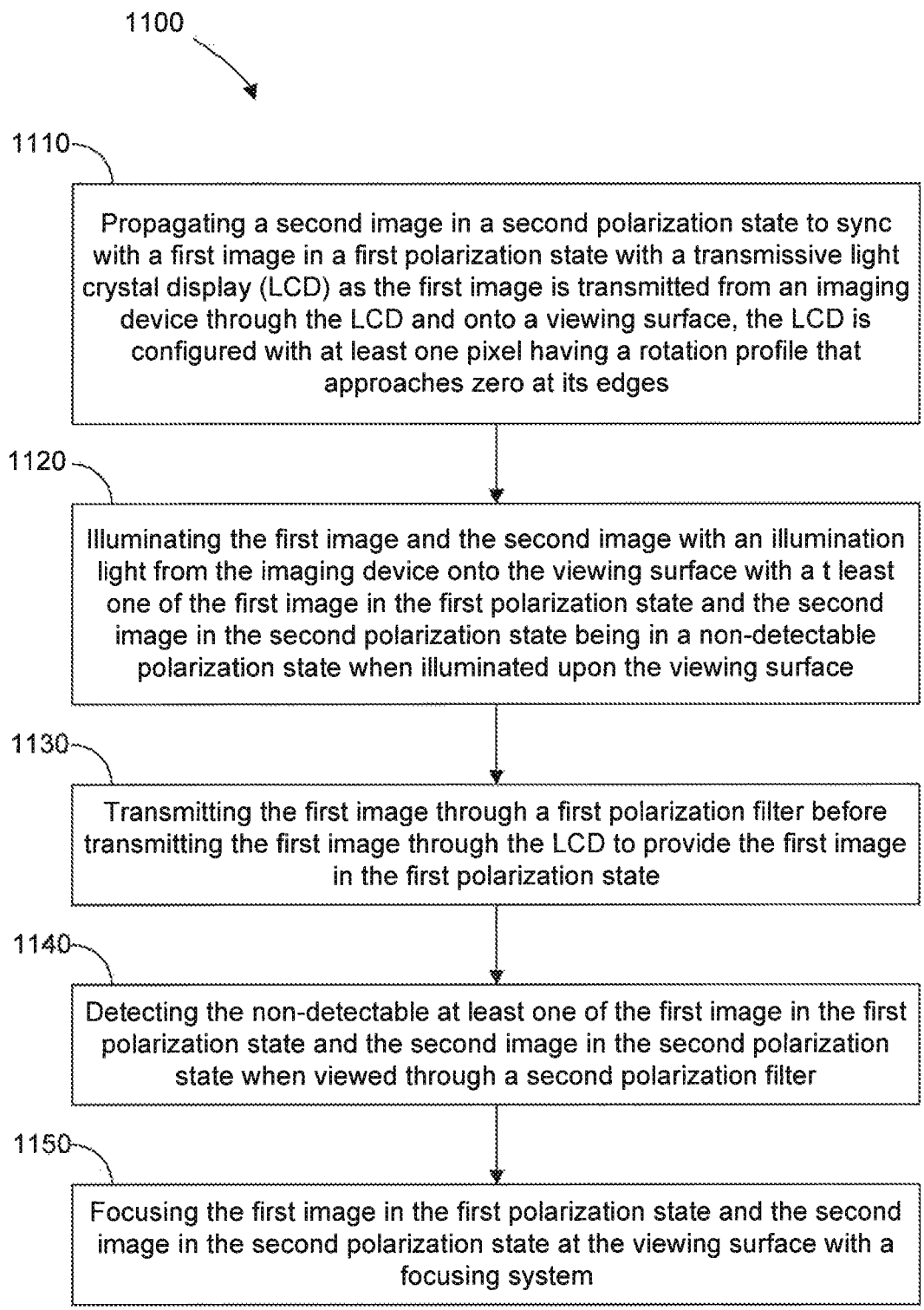
FIG. 10 shows an embodiment of a flowchart illustrating a method.

FIG. 10 shows an embodiment of a flowchart illustrating a method utilizing aspects of an embodiment of a system disclosed herein. The method 1100 comprises propagating a second image in a second polarization state to sync with a first image in a first polarization state with a transmissive liquid crystal display (LCD) as the first image is transmitted from an imaging device through the LCD and onto a viewing surface, the LCD is configured with at least one pixel having a polarization rotation profile that approaches zero at its edges (or an edge of the pixel), at 1110. The method also comprises illuminating the first image and the second image with an illumination light from the imaging device onto the viewing surface with at least one of the first image in the first polarization state and the second image in the second polarization state being in a non-detectable polarization state when illuminated upon the viewing surface, at 1120.

The LCD may be configured with the at least one pixel having transition through the polarization rotation profile is further configured to provide for a gradual transition of the at least one pixel when approaching the edges of the at least one pixel. The at least one pixel of the LCD comprises at least one apodized pixel.

The method 1100 may further comprise transmitting the first image through a first polarization filter before transmitting the first image through the LCD to provide the first image in the first polarization state, at 1130. The method may further comprise detecting the non-detectable at least one of the first image in the first polarization state and the second image in the second polarization state when viewed through a second polarization filter, at 1140. The method may further comprise focusing the first image in the first polarization state and the second image in the second polarization state at the viewing surface with a focusing system, at 1150. Though the steps illustrated above are provided in a particular sequence, this sequence is not meant to be limiting as those skilled in the art will recognize that these steps may be performed in any particular order.

Thus, as disclosed, the system may provide for projecting to a viewing surface with the system comprising an illumination source configured to project a first image onto the viewing surface along a beam path. The system may further comprise a transmissive liquid crystal display (LCD), configured with at least one pixel having a polarization rotation profile that approaches zero at its edges (or an edge of the pixel), for placement in the beam path of the illumination source to the viewing surface to transmit the first image in a first polarization state through the LCD to the viewing surface and to propagate a second image in a second polarization state from the LCD to the viewing surface. The system may further comprise a first polarization filter configured to provide the first image in the first polarization state prior to the first image being transmitted through the LCD. At least one of the first image in the first polarization state and the second image in the second polarization state is in a non-detectable polarization state when illuminated upon the viewing surface. The LCD may have at least one apodized pixel. Though not necessarily a part of the system, a second polarized filter may be used to view the first image, in the first polarized state, and the second image, in the second polarized state, when both images are viewed through the second polarized filter.

In another embodiment, an embodiment of the system may be provided as a kit which may be used with an illumination source that produces a first image in a first polarization state onto a viewing surface. The kit may comprise a transmissive liquid crystal display (LCD), configured with at least one pixel having a polarization rotation profile that approaches zero at its edges (or an edge of the pixel), for placement in the beam path of the imaging device to the viewing surface to transmit the first image in a first polarization state through the LCD to the viewing surface and to propagate a second image in a second polarization state from the LCD to the viewing surface. An illumination light originating from the imaging device provides illuminated light for both the first image and the second image. At least one of the first image in the first polarization state and the second image in the second polarization state is non-detectable when illuminated upon the viewing surface. A first polarized filter may be provided to place the first image in a first polarization state. A second polarized filter may be used to view the first image, in the first polarized state, and the second image, in the second polarized state, when both images are viewed through the second polarized filter.

While various disclosed embodiments have been described above, it should be understood that they have been presented by way of example only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Therefore, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

The invention claimed is:

1. A system for projecting to a viewing surface, the system comprising:
    an image projector to project a first image onto the viewing surface at another location along a beam path to form a projected first image, the beam path being a line of sight from the image projector to the viewing surface;
    a transmissive liquid crystal display (LCD), having at least one pixel having a polarization rotation profile that approaches zero at an edge of the at least one pixel, the LCD at a location in the beam path after the image projector and prior to the viewing surface to propagate the projected first image in a first polarization state through the LCD to the viewing surface and to inject onto the first image projected through the LCD a second image in a second polarization state from the LCD to the viewing surface; and
    a first polarization filter to provide the first image in the first polarization state prior to the projected first image being transmitted through the LCD;
    wherein at least one of the first image in the first polarization state and the second image in the second polarization state is in a non-detectable polarization state when illuminated upon the viewing surface.

2. The system according to claim 1, wherein transition through the polarization rotation profile of the at least one pixel is further configured to provide for a gradual transition of the at least one pixel when approaching the edges of the at least one pixel.

3. The system according to claim 1, wherein the at least one pixel comprises at least one apodized pixel.

4. The system according to claim 1, further comprising a second polarized filter configured to cause the non-detectable polarization state of the at least one of the first image in the first polarization state and the second image in the second polarization state to be detectable when viewed through the second polarized filter.

5. The system according to claim 1, further comprising a synchronizer to introduce the second image upon a transmissive display of the LCD.

6. The system according to claim 5, wherein the synchronizer is further to align a content of the second image with a content of the projected first image.

7. The system according to claim 1, wherein the viewing surface comprises a polarization preserving surface.

8. The system according to claim 1, further comprising a focusing system, in the beam path from the image projector to the viewing surface, to focus the projected first image in the first polarization state and the second image in the second polarization state at the viewing surface.

9. The system according to claim 8, wherein the focusing system further comprises a first focusing element, in the beam path after the image projector to the viewing surface, to focus the projected first image, in the first polarization state, on the LCD.

10. The system according to claim 8, wherein the focusing system further comprises second focusing element, at a location in the beam path after the LCD, to focus the projected first image and the second image, illuminated from the LCD, on the viewing surface.

11. A kit for use with an imaging device that produces a projected first image in a first polarization state in a line of sight onto a viewing surface, the kit comprising:
    a transmissive liquid crystal display (LCD), with at least one pixel having a polarization rotation profile that approaches zero at an edge of the at least one pixel, for placement at a location in the line of sight after the imaging device to the viewing surface to transmit the projected first image in a first polarization state through the LCD to the viewing surface and to inject onto the projected first image projected through the LCD a second image in a second polarization state from the LCD to the viewing surface;
    wherein an illumination light originating from the imaging device provides illuminated light for both the projected first image and the second image; and
    wherein at least one of the projected first image in the first polarization state and the second image in the second polarization state is non-detectable when illuminated upon the viewing surface.

12. The kit according to claim 11, wherein transition through the polarization rotation profile of the at least one pixel is further configured to provide for a gradual transition of the at least one pixel when approaching the edges of the at least one pixel.

13. The kit according to claim 11, wherein the at least one pixel comprises at least one apodized pixel.

14. The kit according to claim 11, further comprising a first polarization filter, at a location in the line of sight after the imaging device to the viewing surface, to provide the projected first image in the first polarization state.

15. The kit according to claim 11, further comprising a second polarized filter configured to cause the non-detectable at least one of the first image in the first polarization state and the second image in the second polarization state to be detectable when viewed through the second polarized filter.

16. The kit according to claim 11, further comprising a synchronizer to introduce the second image upon a transmissive display of the LCD.

17. The kit according to claim 16, wherein the synchronizer is further to align a content of the second image with a content of the projected first image.

18. The kit according to claim 11, wherein the viewing surface comprises a polarization preserving surface.

19. The kit according to claim 11, further comprising a focusing system, at a location in the line of sight after the imaging device to the viewing surface, to focus the projected first image in the first polarization state and the second image in the second polarization state at the viewing surface.

20. A method comprising:
    injecting, by a transmissive liquid crystal display (LCD), a second image in a second polarization state onto and synchronized with a projected first image in a first polarization state while the projected first image is transmitted from an imaging device along a line of sight to a viewing surface, through the LCD being at a location in the line of sight after the imaging device and onto the viewing surface, the LCD including at least one pixel having a polarization rotation profile that approaches zero at an edge of the at least one pixel;

propagating, by the LCD, the injected second image onto the viewing surface while the projected first image is transmitted from the imaging device through the LCD; and illuminating, with an illumination light from the imaging device, both the projected first image from the imaging device and the injected second image from the LCD onto the viewing surface with at least one of the projected first image in the first polarization state and the injected second image in the second polarization state being in a non-detectable polarization state when illuminated upon the viewing surface.

21. The method according to claim 20, wherein the LCD further to provide for a gradual transition of the at least one pixel when approaching the edges of the at least one pixel.

22. The method according to claim 20, wherein the at least one pixel of the LCD comprises at least one apodized pixel.

23. The method according to claim 20, further comprising transmitting the projected first image through a first polarization filter, in the line of sight after the imaging device to the viewing surface, before transmitting the projected first image through the LCD to provide the projected first image in the first polarization state.

24. The method according to claim 20, further comprising detecting the non-detectable polarization state of the at least one of the projected first image in the first polarization state and the second image in the second polarization state when viewed through a second polarization filter.

25. The method according to claim 20, further comprising focusing the projected first image in the first polarization state and the second image in the second polarization state at the viewing surface with a focusing system.

* * * * *